Dec. 24, 1946. W. A. LA LANDE, JR 2,413,185
REMOVAL OF VOLATILE METAL HALIDES FROM FLUIDS
Filed May 27, 1944
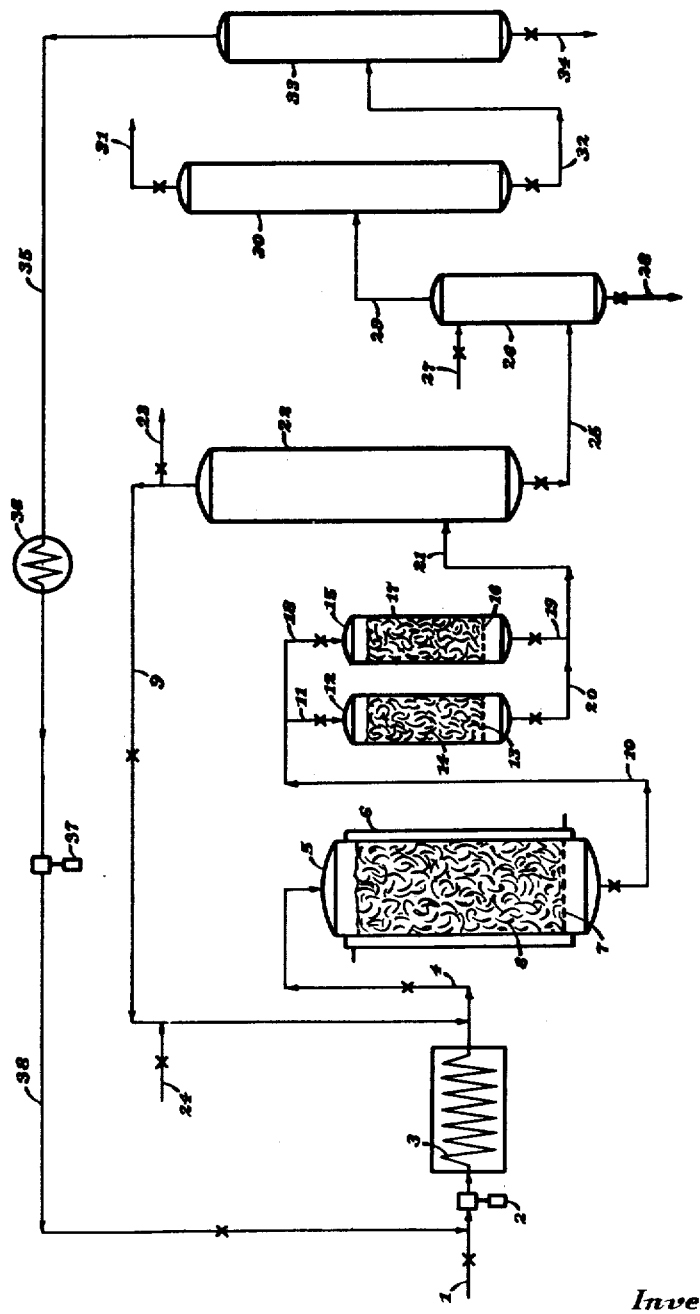
Attest
John G. Butz
Andrew T. Zodll
Inventor
William A. LaLande, Jr.
By Norbert E. Buck
Attorney Patented Dec. 24, 1946

2,413,185

UNITED STATES PATENT OFFICE 2,413,185

REMOVAL OF VOLATILE METAL HALIDES FROM FLUIDS

William A. La Lande, Jr., Upper Darby, Pa., assignor to Porocel Corporation, Philadelphia, Pa., a corporation of Delaware Application May 27, 1944, Serial No. 537,718

14 Claims. (Cl. 23—154)

The present invention relates to the removal of volatile metal halides from fluids containing same, and relates more particularly to the treatment of hydrocarbon fluids containing aluminum chloride for the removal of the aluminum chloride by conversion into useful and separable byproducts.

Volatile metal halides have been applied as catalysts or condensing agents in a variety of chemical reactions, among which may be mentioned the isomerization of normal paraffin hydrocarbons to branched-chain paraffin hydrocarbons, the polymerization of olefins or diolefins for the production of motor fuels, resins, or rubberlike products, the alkylation of isoparaffins with olefins, the alkylation of aromatic hydrocarbons or phenols with olefins or alkyl halides, the cracking of hydrocarbon oils for the production of gasoline, the refining of cracked gasoline or lubricating oils, and the production of numerous synthetic chemical compounds. In the above treatments or reactions it frequently occurs that the metal halide catalyst becomes entrained or dissolved in the desired reaction product, regardless of whether the product is a liquid, vapor, or gas, and it becomes necessary to remove the catalyst preferably in such a manner that it may be regenerated or converted into useful by-products. In most instances it is virtually impossible to regenerate the catalyst, particularly aluminum chloride, so that it may be re-used as such. The method of the present invention is therefore directed to the removal of the catalyst from the product or products of the reaction, and the conversion of such catalyst into useful by-products, one or more of which may be returned to enter into or assist in the reaction being catalyzed.

In accordance with the present invention, the fluid containing dissolved or entrained volatile metal halide catalyst is brought into intimate contact with an alkali metal acid sulfate, such as the acid sulfates of sodium, potassium, or lithium, under conditions such that the metal halide is caused to react with the acid sulfate with the resultant production of alkali metal sulfate, the sulfate of the metal corresponding to the metal halide, and hydrogen halide. The alkali metal acid sulfate is preferably employed in the solid state, i. e., crystals or granules which may be formed into a bed and through which the fluid containing the metal halide may be passed. Or, the acid sulfate may be mixed with an inert supporting medium or carrier such as pumice, fuller's earth, bentonite, acid activated bentonite, bauxite, alumina, silica, carbon, charcoal, or the like, the carrier being inert to hydrogen halide under the reaction conditions. Alternatively, the supporting medium or carrier may be impregnated with a solution of the alkali metal acid sulfate, and the carrier then dried at a suitable temperature so that the surfaces and pores of the carrier are coated with solid acid sulfate. If desired, the acid sulfate either supported or unsupported, may be commingled with or dispersed in the fluid containing the metal halide, and the solid by-products from the resulting reaction may be separated from the treated fluid by settling, decantation, filtering, or centrifuging. The treatment of the fluid containing the metal halide with the alkali metal acid sulfate may be carried out at temperatures up to the decomposition temperature of the acid sulfate, which in the case of sodium acid sulfate ($NaHSO_4$) is about 475° F. to 500° F. Such temperature, however, must be below that at which the fluid undergoing treatment will be deleteriously affected either by the metal halide or the by-products resulting from the reaction between the metal halide and the acid sulfate. The pressure under which the treatment is carried out may be subatmospheric, atmospheric, or superatmospheric, depending largely upon the nature of the fluid to be treated, and upon whether it is desired to maintain the fluid in the liquid or gaseous state during the treatment.

As pointed out hereinabove, the fluid containing the metal halide is brought into contact with the alkali metal acid sulfate preferably in the solid state. The resulting reaction produces alkali metal sulfate, the sulfate of the metal corresponding to the metal halide, and anhydrous hydrogen halide. The quantity of alkali metal acid sulfate employed is in excess of that required to completely react with the metal halide, so that upon completion of the treatment, the excess of solid alkali metal acid sulfate, alkali metal sulfate, and metal sulfate may be separated as solids from the treated fluid and hydrogen halide. The hydrogen halide may then be separated from the treated fluid by fractional distillation or other means, depending upon whether or not it is desired to preserve the hydrogen halide, as such, for reuse, or to convert the hydrogen halide into other products. While the method of the present invention is particularly adapted for the removal of aluminum chloride from fluids containing same, it may be equally well applied in the treatment of fluids, especially non-aqueous fluids, containing one or more of the volatile metal halides such as $AlBr_3$, $AlI_3$, $FeCl_3$, $SbCl_3$, $SbBr_3$, $SbI_3$, $SbF_3$, SnCl₄, SnBr₄, SnI₄, TiCl₄, TiBr₄, TiI₄, SiCl₄, SiBr₄, and SiF₄. Non-aqueous fluids containing volatile metal halides which may be treated in accordance with this invention include liquid hydrocarbons; gaseous hydrocarbons; liquefied normally gaseous hydrocarbons; gases such as hydrogen, oxygen, air, nitrogen, carbon monoxide, carbon dioxide, sulfur dioxide; halogenated hydrocarbons, alkyl halides, aryl halides, alcohols, esters, ethers, etc.

The present invention may be further illustrated by the following example, considered in conjunction with the accompanying drawing which shows diagrammatically an apparatus suitable for carrying out the process.

Referring to the drawing, n-butane or gas containing a high concentration thereof is supplied to the system through valve-controlled pipe 1 and is pumped by means of pump 2 to heater 3 wherein it is heated to a temperature between 175° F. and 400° F., and preferably about 200° F. to 220° F. The pressure in the system is so regulated that the butane is vaporized at this temperature, and the pressure is preferably maintained not substantially below the highest pressure at which the butane can exist as a vapor at the conversion temperature. From the heater 3 the butane vapors are passed by means of valve-controlled pipe 4 into the upper section of the reaction or isomerization chamber 5 provided with jacket 6 through which a suitable medium may be circulated to assist in maintaining the chamber and its contents at the desired conversion temperature. In the reaction chamber temperatures of the order of 200° F. to 210° F. and pressures of the order of 150 to 200 pounds per square inch have been found satisfactory for efficient operation. In general, pressures between 100 and 300 pounds per square inch and temperatures between 200° F. and 350° F. are preferred. The reaction chamber 5 is further provided near its base with a grid or screen 7 for supporting the isomerization catalyst 8, such catalyst comprising Activated Alumina or bauxite granules or pellets impregnated with anhydrous AlCl₃ (12 to 18 per cent by weight).

During the passage of the n-butane vapors through valve-controlled pipe 4, a small quantity of promoter such as 3 mole per cent of anhydrous hydrogen chloride (HCl) is added through pipe 9. The n-butane and promoter is passed through the catalyst bed 8 where partial isomerization to isobutane is effected. During such passage the vapors will become contaminated with sublimed AlCl₃ and in fact, may have become substantially saturated with such catalyst. In order to remove the sublimed AlCl₃ from the mixture of n-butane, isobutane, traces of isopentane, and HCl, the mixture is passed without substantial change in temperature through valve-controlled pipes 10 and 11 into the upper section of vessel 12 provided with screen 13 supporting a bed of alkali metal acid sulfate 14, for example, sodium acid sulfate. A second vessel 15 is provided for alternate use, such vessel likewise having a screen 16 supporting a bed of acid sulfate 17. When not in use, inlet valve 18 and outlet valve 19 are closed, and are only opened when it is desired to operate continuously while replenishing the spent bed of acid sulfate contained in vessel 12.

The mixture of n-butane, isobutane, isopentane, and HCl containing sublimed AlCl₃ is passed downwardly through vessel 12 in intimate contact with the solid sodium acid sulfate contained therein. During such passage, the AlCl₃ contained in the hydrocarbon-HCl mixture reacts with the sodium acid sulfate to produce sodium sulfate, aluminum sulfate, and anhydrous HCl. The sodium sulfate and aluminum sulfate are retained in the bed of acid sulfate, while the hydrocarbon vapors and HCl pass through the bed and are withdrawn from the bottom of vessel 12 through valve-controlled pipe 20 and introduced by pipe 21 into the fractionating or stripping tower 22. At such time as the acid sulfate in vessel 12 becomes spent, such vessel may be taken off stream by closing the valves in pipes 11 and 20, and the second vessel 15 may be placed on stream by opening valves 18 and 19. Continuous operation is maintained by the alternate use of vessels 12 and 15, one being cleaned and recharged with fresh acid sulfate when the other is on stream.

The hydrocarbon-HCl mixture introduced into stripping tower 22 is fractionated so as to separate the HCl from the hydrocarbons, the HCl being recycled by valve-controlled pipes 9 and 4 for reuse in the isomerization reaction. The temperature at the bottom of the stripper 22 may be of the order of 220° F.–230° F. and at the top 80° F.–90° F., the pressure being about 300 pounds per square inch. Recycle HCl may be withdrawn from the system by means of valve-controlled pipe 23, and sufficient HCl may be introduced into the system through valve-controlled pipe 24 as necessity requires.

From the bottom of the stripper 22, the product comprising hydrocarbons and traces of HCl is introduced by means of valve-controlled pipe 25 into the lower section of neutralizing tower 26. An aqueous alkaline solution is supplied to the upper portion of tower 26 through valve-controlled pipe 27 and passes downwardly therethrough in intimate countercurrent contact with the rising stream of hydrocarbons, thus neutralizing and removing residual HCl from the hydrocarbons. The spent alkaline solution is removed from tower 26 through valve-controlled pipe 28 and may be disposed of as desired. The hydrocarbon mixture is then passed from the top of tower 26 through pipe 29 into fractionator 30 wherein the mixture is separated into a fraction consisting largely of isobutane and a fraction comprising n-butane and traces of heavier hydrocarbons such as isopentane. The isobutane is removed from the top of the fractionator through valve-controlled pipe 31 and is passed to storage. The fraction comprising n-butane and heavier hydrocarbons is drawn from the bottom of fractionator 30 and is introduced by valve-controlled pipe 32 into the stripper or fractionating tower 33 wherein the heavier hydrocarbons are separated from the n-butane and passed to storage through valve-controlled pipe 34. The n-butane vapors are passed from the top of the stripper 33 by means of pipe 35, cooled and condensed in condenser 36 and returned by pump 37 and valve-controlled pipe 38 to pipe 1 for recirculation to the isomerization chamber. While not specifically shown in the drawing, drying means such as a tower containing Activated Alumina, or bauxite, or silica gel, may be installed in series with either or both of pipes 1 and 38 in order to remove moisture from the n-butane charged to the isomerization chamber.

While the present invention is particularly adapted to systems for isomerizing n-butane, such invention is also applicable in systems for isomerizing other hydrocarbons, including pentane, hexane, and the like, or mixtures containing butane, pentane, and hexane. Petroleum naphthas, especially straight-run naphthas containing normal paraffin hydrocarbons may also be treated in accordance with this invention. In general, the method of the present invention may be applied in the removal of volatile metal halides from fluids and particularly non-aqueous fluids containing entrained or dissolved metal halide.

I claim:

1. The method of removing a volatile metal halide from a non-aqueous fluid containing same, which comprises contacting said fluid with an alkali metal acid sulfate to form alkali metal sulfate, metal sulfate, and hydrogen halide.

2. The method of removing a volatile metal halide from a non-aqueous fluid containing same, which comprises contacting said fluid with an alkali metal acid sulfate to form alkali metal sulfate, metal sulfate, and hydrogen halide, removing the treated fluid containing hydrogen halide from contact with said sulfates, and separating the hydrogen halide from the treated fluid.

3. The method of removing a volatile metal halide from a hydrocarbon fluid containing same, which comprises contacting said hydrocarbon fluid with an alkali metal acid sulfate to form alkali metal sulfate, metal sulfate, and hydrogen halide.

4. The method of removing a volatile metal halide from a hydrocarbon fluid containing same, which comprises contacting said hydrocarbon fluid with an alkali metal acid sulfate to form alkali metal sulfate, metal sulfate, and hydrogen halide, removing the treated hydrocarbon fluid containing hydrogen halide from contact with said sulfates, and separating the hydrogen halide from the treated hydrocarbon fluid.

5. The method of removing a volatile metal halide from a hydrocarbon fluid containing same, which comprises contacting said hydrocarbon fluid with an alkali metal acid sulfate supported upon an inert, solid carrier to form alkali metal sulfate, metal sulfate, and hydrogen halide.

6. The method of removing a volatile metal halide from a hydrocarbon fluid containing same, which comprises contacting said hydrocarbon fluid with an alkali metal acid sulfate supported upon an inert, solid carrier to form alkali metal sulfate, metal sulfate, and hydrogen halide, removing the treated hydrocarbon fluid containing hydrogen halide from contact with said sulfates, and separating the hydrogen halide from the treated hydrocarbon fluid.

7. The method of removing aluminum chloride from hydrocarbon vapor containing same, which comprises contacting said vapor with sodium acid sulfate to form sodium sulfate, aluminum sulfate, and hydrogen chloride.

8. The method of removing aluminum chloride from hydrocarbon vapor containing same, which comprises contacting said vapor with sodium acid sulfate to form sodium sulfate, aluminum sulfate, and hydrogen chloride, removing the treated vapor containing hydrogen chloride from contact with said sulfates, and separating the hydrogen chloride from the treated vapor.

9. The method of removing aluminum chloride from hydrocarbon vapor containing same, which comprises contacting said vapor with sodium acid sulfate supported upon an inert, solid carrier to form sodium sulfate, aluminum sulfate, and hydrogen chloride.

10. The method of removing aluminum chloride from hydrocarbon vapor containing same, which comprises contacting said vapor with sodium acid sulfate supported upon an inert, solid carrier to form sodium sulfate, aluminum sulfate, and hydrogen chloride, removing the treated vapor containing hydrogen chloride from contact with said sulfates, and separating the hydrogen chloride from the treated vapor.

11. The method of removing aluminum chloride from a vaporous mixture including isobutane, which comprises contacting said vaporous mixture with sodium acid sulfate to form sodium sulfate, aluminum sulfate, and hydrogen chloride.

12. The method of removing aluminum chloride from a vaporous mixture including isobutane, which comprises contacting said vaporous mixture with sodium acid sulfate to form sodium sulfate, aluminum sulfate, and hydrogen chloride, removing the treated vaporous mixture containing hydrogen chloride from contact with said sulfates, and separating the hydrogen chloride from the treated vaporous mixture.

13. The method of removing aluminum chloride from a vaporous mixture including isobutane, which comprises contacting said vaporous mixture with sodium acid sulfate supported upon a solid adsorbent to form sodium sulfate, aluminum sulfate, and hydrogen chloride.

14. The method of removing aluminum chloride from a vaporous mixture including isobutane, which comprises contacting said vaporous mixture with sodium acid sulfate supported upon a solid adsorbent to form sodium sulfate, aluminum sulfate, and hydrogen chloride, removing the treated vaporous mixture containing hydrogen chloride from contact with said sulfates, and separating the hydrogen chloride from the treated vaporous mixture.

WILLIAM A. LA LANDE, JR.

Disclaimer 2,413,185.—*William A. La Lande, Jr.*, Upper Darby, Pa. REMOVAL OF VOLATILE METAL HALIDES FROM FLUIDS. Patent dated Dec. 24, 1946. Disclaimer filed Mar. 24, 1948, by the assignee, *Porocel Corporation*.

Hereby enters this disclaimer to claims 3, 4, 7, 8, 11, and 12 of said patent.

(*Official Gazette April 20, 1948.*)

mal paraffin hydrocarbons may also be treated in accordance with this invention. In general, the method of the present invention may be applied in the removal of volatile metal halides from fluids and particularly non-aqueous fluids containing entrained or dissolved metal halide.

I claim:

1. The method of removing a volatile metal halide from a non-aqueous fluid containing same, which comprises contacting said fluid with an alkali metal acid sulfate to form alkali metal sulfate, metal sulfate, and hydrogen halide.

2. The method of removing a volatile metal halide from a non-aqueous fluid containing same, which comprises contacting said fluid with an alkali metal acid sulfate to form alkali metal sulfate, metal sulfate, and hydrogen halide, removing the treated fluid containing hydrogen halide from contact with said sulfates, and separating the hydrogen halide from the treated fluid.

3. The method of removing a volatile metal halide from a hydrocarbon fluid containing same, which comprises contacting said hydrocarbon fluid with an alkali metal acid sulfate to form alkali metal sulfate, metal sulfate, and hydrogen halide.

4. The method of removing a volatile metal halide from a hydrocarbon fluid containing same, which comprises contacting said hydrocarbon fluid with an alkali metal acid sulfate to form alkali metal sulfate, metal sulfate, and hydrogen halide, removing the treated hydrocarbon fluid containing hydrogen halide from contact with said sulfates, and separating the hydrogen halide from the treated hydrocarbon fluid.

5. The method of removing a volatile metal halide from a hydrocarbon fluid containing same, which comprises contacting said hydrocarbon fluid with an alkali metal acid sulfate supported upon an inert, solid carrier to form alkali metal sulfate, metal sulfate, and hydrogen halide.

6. The method of removing a volatile metal halide from a hydrocarbon fluid containing same, which comprises contacting said hydrocarbon fluid with an alkali metal acid sulfate supported upon an inert, solid carrier to form alkali metal sulfate, metal sulfate, and hydrogen halide, removing the treated hydrocarbon fluid containing hydrogen halide from contact with said sulfates, and separating the hydrogen halide from the treated hydrocarbon fluid.

7. The method of removing aluminum chloride from hydrocarbon vapor containing same, which comprises contacting said vapor with sodium acid sulfate to form sodium sulfate, aluminum sulfate, and hydrogen chloride.

8. The method of removing aluminum chloride from hydrocarbon vapor containing same, which comprises contacting said vapor with sodium acid sulfate to form sodium sulfate, aluminum sulfate, and hydrogen chloride, removing the treated vapor containing hydrogen chloride from contact with said sulfates, and separating the hydrogen chloride from the treated vapor.

9. The method of removing aluminum chloride from hydrocarbon vapor containing same, which comprises contacting said vapor with sodium acid sulfate supported upon an inert, solid carrier to form sodium sulfate, aluminum sulfate, and hydrogen chloride.

10. The method of removing aluminum chloride from hydrocarbon vapor containing same, which comprises contacting said vapor with sodium acid sulfate supported upon an inert, solid carrier to form sodium sulfate, aluminum sulfate, and hydrogen chloride, removing the treated vapor containing hydrogen chloride from contact with said sulfates, and separating the hydrogen chloride from the treated vapor.

11. The method of removing aluminum chloride from a vaporous mixture including isobutane, which comprises contacting said vaporous mixture with sodium acid sulfate to form sodium sulfate, aluminum sulfate, and hydrogen chloride.

12. The method of removing aluminum chloride from a vaporous mixture including isobutane, which comprises contacting said vaporous mixture with sodium acid sulfate to form sodium sulfate, aluminum sulfate, and hydrogen chloride, removing the treated vaporous mixture containing hydrogen chloride from contact with said sulfates, and separating the hydrogen chloride from the treated vaporous mixture.

13. The method of removing aluminum chloride from a vaporous mixture including isobutane, which comprises contacting said vaporous mixture with sodium acid sulfate supported upon a solid adsorbent to form sodium sulfate, aluminum sulfate, and hydrogen chloride.

14. The method of removing aluminum chloride from a vaporous mixture including isobutane, which comprises contacting said vaporous mixture with sodium acid sulfate supported upon a solid adsorbent to form sodium sulfate, aluminum sulfate, and hydrogen chloride, removing the treated vaporous mixture containing hydrogen chloride from contact with said sulfates, and separating the hydrogen chloride from the treated vaporous mixture.

WILLIAM A. LA LANDE, JR.

Disclaimer 2,413,185.—*William A. La Lande, Jr.*, Upper Darby, Pa. REMOVAL OF VOLATILE METAL HALIDES FROM FLUIDS. Patent dated Dec. 24, 1946. Disclaimer filed Mar. 24, 1948, by the assignee, *Porocel Corporation*.

Hereby enters this disclaimer to claims 3, 4, 7, 8, 11, and 12 of said patent.

(*Official Gazette April 20, 1948*.)